April 27, 1954  C. U. BALLARD  2,676,374
HOOK ATTACHMENT FOR TAPE MEASURE END LOOPS
Filed April 26, 1951
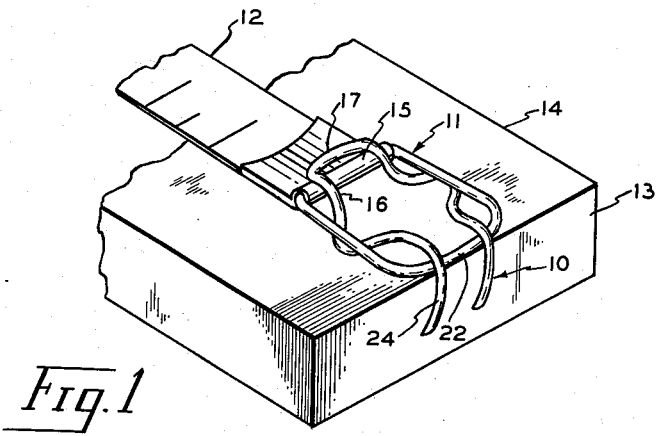
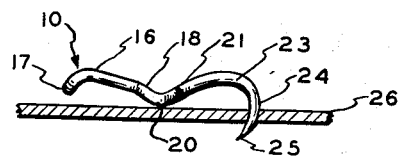
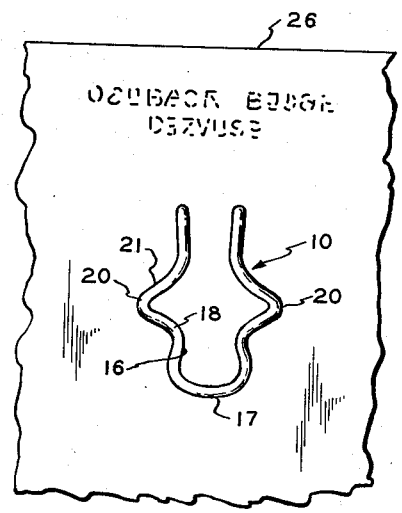
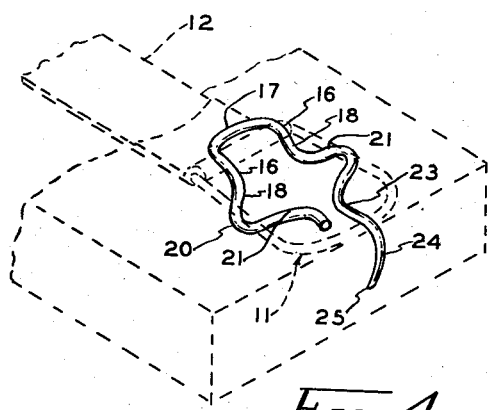
INVENTOR
CHARLES U. BALLARD
BY Gustave Miller
ATTORNEY Patented Apr. 27, 1954

2,676,374

UNITED STATES PATENT OFFICE 2,676,374

HOOK ATTACHMENT FOR TAPE MEASURE END LOOPS

Charles U. Ballard, Inglewood, Calif.

Application April 26, 1951, Serial No. 223,099

1 Claim. (Cl. 24—73)

This invention relates to a hook attachment to a tape measure end loop and has for an object to provide an improved hook attachment which may be readily attached to the end loop of a tape measure, by merely squeezing the sides thereof inwardly to enable such sides to pass through the loop and thus secure the attachment in position thereon, thereby making it possible for a person to hook the end of the tape measure to an object and extend the tape measure therefrom to take measurements from such point.

A further object of this invention is to provide a hook attachment for a tape measure end loop which hook attachment is made of a single band of spring wire formed initially in the shape of a U, with the legs of the U so curved both longitudinally and transversely that the U will hold itself on the end loop of a tape measure, with one or both ends of the U formed into a sharpened hook to engage the object to which the end of the tape measure is to be hooked.

Still a further object of this invention is to provide a self holding hook attachment for the end loop of a tape measure, which hook attachment will hold itself on the end loop when put in position and then will hold the end of the tape measure hooked to any convenient object when taking measurements therefrom and is applicable to tape measures of any length.

Still a further object of this invention is to provide a hook attachment to the end loop of a tape measure, which hook attachment may be easily carded on a card or display easel by merely pressing the sharpened hook ends of the attachment therethrough, thus enabling the hook attachment to be very inexpensively packaged for marketing purposes.

With the foregoing and other objects in view, this invention comprises the combination, construction and arrangement of parts hereinafter set forth, claimed and disclosed in the accompanying drawings, wherein:

Fig. 1 is a perspective detail view showing the hook attachment of this invention in operative position on the end loop of a tape measure;

Fig. 2 is a side elevational view of the hook attachment per se mounted on a display card;

Fig. 3 is a top plan view of Fig. 2; and

Fig. 4 is a perspective view of a slightly modified form of hook attachment.

There is shown at 10 the hook attachment of this invention. The hook attachment 10 is formed of spring wire broadly in the form of a U. It is intended for attaching the end loop 11 of a tape measure 12 to the end 13 of an object 14, thus enabling measurements to be made along the object 14 by a single person, without the necessity of having someone hold the end loop 11 in position. The end loop 11 of the tape measure 12 is generally somewhat rectangular in outline with its base end 15 secured to the tape measure 12 in a conventional manner.

The legs and end bight of the U of the hook attachment are concavely curved longitudinally on its confronting face at 16 adjacent the bight 17 so that the curved portion 16 may extend over and about the base end 15 of the loop 11. The intermediate portions of the U legs are then bent convexly on the side toward the loop 11 and also transversely and laterally extending outwardly from each other at 18 until portions 20 in the U legs are spaced apart a distance greater than the width of the loop 11. Then leg portions are concavely curved inwardly again on their confronting face at 21 to a distance less than the width of the loop 11 whereupon they again resume their longitudinal direction at which point they are curved longitudinally and directed backwardly at their pointed ends so as to extend over and about the end bar 22 of the loop 11 as shown at 23.

Then, the end portions 24 are bent downwardly and are provided with slightly reversely bent sharpened points at 25, which points 25 serve to hook over and secure themselves against the end 13 of the object 14 being measured.

In marketing the attachment hook 10, it may be easily packaged by carding it on a display card or easel 26 by merely squeezing it together a very slight amount before pressing the sharpened points 25 through the card 26, whereupon the attachment will hold itself in display position on the card 26.

In operation, to attach the hook 10 to the end loop 11 of the tape measure, it is merely grasped adjacent its ends either at 23 or 24 between one's fingers and squeezed together so as to spring points 20 inwardly toward each other until they are less than the inside width of the loop apart, whereupon the bight 17 may be placed over the loop base 15, the points 20 placed under the sides of the loop 11 and the points 23 placed over and about the ends 22 of loop 11, thus securely attaching the hook attachment 10 in position on the loop 11 and enabling the end of the tape measure to be hooked to any convenient object as already described.

Obviously, the hook attachment will be just as operative if either one of the sharpened ends 25 and adjacent portions 24 are omitted in the form shown in Fig. 4 which is identical in construction and operation otherwise, but for purposes of symmetry it is preferred to use the form having sharpened hook ends on both of the U legs.

While the device has been shown and the structure described in detail, it is obvious that this invention is not to be considered as being limited to the exact form disclosed, and that changes in detail and construction may be made therein within the scope of what is claimed, without departing from the spirit of this invention.

Having thus set forth and disclosed the nature of this invention, what is claimed is:

A hook attachment for securing the loop at the end of a tape measure to the end of and on the surface of an object having an edge comprising, a single strand of U-shaped wire adapted and arranged to releasably engage the loop in face to face relation, said wire having a bight end and leg portions connected together by laterally extending outwardly bent intermediate portions, said bight end being concavely curved on its confronting face and being adapted and arranged to engage the base of the loop, said leg portions being concavely curved on their confronting faces and backwardly directed at their pointed ends to engage and to extend over the bight of the loop and to engage the edge of the object, said intermediate portions being convexly curved on their confronting faces to a plane sufficiently below the plane of the bight end and leg portions to enter the loop between its base and bight when sprung together and to engage on their non-confronting faces the sides of the loop when released.

References Cited in the file of this patent

UNITED STATES PATENTS

| Number | Name | Date |
|---|---|---|
| 718,716 | Lucas | Jan. 20, 1903 |
| 1,631,682 | Hoffstetter | June 7, 1927 |
| 1,786,845 | Hipple | Dec. 30, 1930 |
| 1,843,703 | Boden | Feb. 2, 1932 |
| 1,948,462 | Le Page | Feb. 20, 1934 |
| 2,219,966 | Smitt | Oct. 29, 1940 |
| 2,299,490 | Newman | Oct. 20, 1942 |